United States Patent
Neumann et al.

(10) Patent No.: US 9,771,027 B2
(45) Date of Patent: Sep. 26, 2017

(54) CONSOLE SUPPORT PANEL AND CONSOLE ASSEMBLY EMPLOYING THE SAME

(71) Applicant: FORD GLOBAL TECHNOLOGIES, LLC, Dearborn, MI (US)

(72) Inventors: Michael Neumann, Victoria (AU); Vikas Saigal, Victoria (AU)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/171,220

(22) Filed: Jun. 2, 2016

(65) Prior Publication Data
US 2017/0015250 A1    Jan. 19, 2017

(30) Foreign Application Priority Data

Jul. 17, 2015 (CN) .......................... 2015 1 0423376

(51) Int. Cl.
*B60R 7/04* (2006.01)
*B60N 3/10* (2006.01)

(52) U.S. Cl.
CPC . *B60R 7/04* (2013.01); *B60N 3/10* (2013.01)

(58) Field of Classification Search
CPC .................................. B60R 7/04; B60N 3/10
USPC ......... 296/24.34, 37.8, 37.12, 37.13; 16/257, 16/259, 267, 268
See application file for complete search history.

(56) References Cited

U.S. PATENT DOCUMENTS

| 4,358,141 A * | 11/1982 | Hamada ................ E05B 85/243 |
| | | 292/216 |
| 7,658,295 B2 * | 2/2010 | Hoepner ............ B65D 47/0885 |
| | | 215/235 |
| 8,727,402 B2 | 5/2014 | Bejune et al. |
| 8,833,812 B2 | 9/2014 | Sakai et al. |
| 2004/0201238 A1 * | 10/2004 | Griggs, Jr. ........... B60N 2/4686 |
| | | 296/24.34 |
| 2011/0115240 A1 | 5/2011 | Muller et al. |
| 2012/0067657 A1 | 3/2012 | Lesueur et al. |
| 2013/0221690 A1 | 8/2013 | Rocci et al. |
| 2013/0249231 A1 * | 9/2013 | Winiger ................ B60R 7/04 |
| | | 296/24.34 |
| 2014/0145453 A1 | 5/2014 | Zhang et al. |
| 2014/0232122 A1 | 8/2014 | Schnetter et al. |

FOREIGN PATENT DOCUMENTS

| DE | 1440257 | 6/1995 |
| DE | 102010056436 | 6/2012 |

* cited by examiner

*Primary Examiner* — Dennis H Pedder
(74) *Attorney, Agent, or Firm* — Alice Xu; Mohr IP Law Solutions, PC

(57) ABSTRACT

The present invention in one or more embodiments provides a console support panel which includes a first portion defining a cavity to receive therein a pivot shaft of an inertia block; and a second portion positioned next to the first portion and to support a movable cover, wherein the first portion further includes a lead-in rib extending into the cavity to restrain translational movement of the pivot shaft. In certain embodiments, the lead-in rib includes first and second lead-in ribs to restrain translational movement of first and second ends of the pivot shaft, respectively.

12 Claims, 6 Drawing Sheets

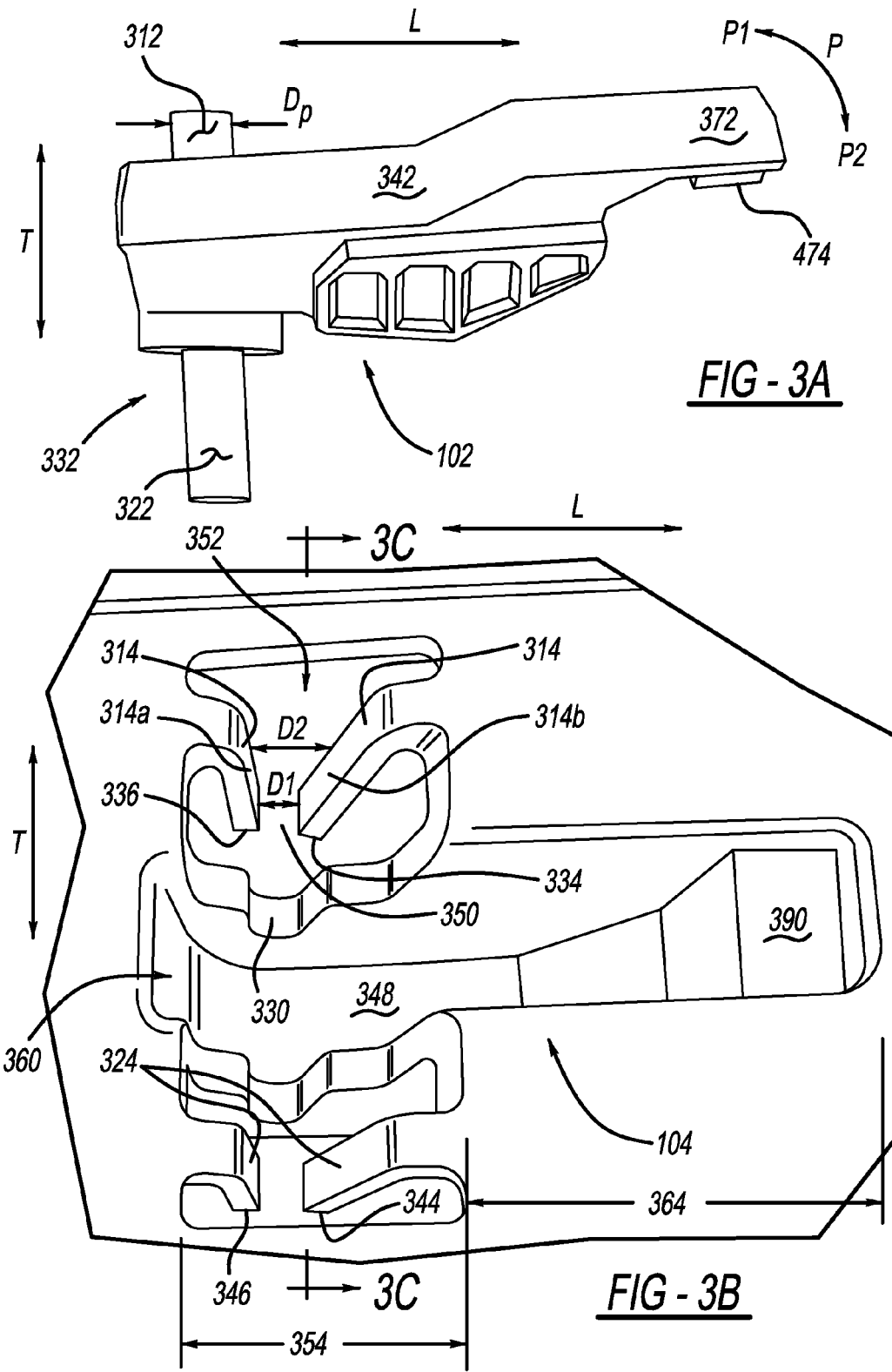

CONSOLE SUPPORT PANEL AND CONSOLE ASSEMBLY EMPLOYING THE SAME

RELATED APPLICATIONS(S)

This application claims the benefit of Chinese New Invention Patent Application No.: CN 201510423376.8, filed on Jul. 17, 2015, the entire contents thereof being incorporated herein by reference.

TECHNICAL FIELD

The disclosed inventive concept relates generally to a console support panel and a console assembly employing the same.

BACKGROUND

Storage containers with covers are often provided in consoles of vehicles. Under certain circumstances such as during a collision it may be desirable to keep the containers in a covered state to avoid any stored objects to fly out therefrom and cause injuries.

Storage covers are used on some of these storage containers to achieve this purpose. For instance, U.S. Pat. No. 8,191,953 B2 discloses a lid to cover a central console along with an inertial lock as a latch for positioning the lid.

SUMMARY

One or more embodiments of the present invention relates to a console support panel and a vehicle console assembly including the same.

In one or more embodiments, the console support panel includes a first portion defining a cavity to receive therein a pivot shaft of an inertia block, and a second portion positioned next to the first portion and to support a movable cover, wherein the first portion further includes a lead-in rib extending into the cavity to restrain translational movement of the pivot shaft. In certain embodiments, the lead-in rib includes first and second lead-in ribs to restrain translational movement of first and second ends of the pivot shaft, respectively.

One or more advantageous features as described herein will be readily apparent from the following detailed description of one or more embodiments when taken in connection with the accompanying drawings.

BRIEF DESCRIPTION OF THE DRAWINGS

For a more complete understanding of one or more embodiments of the present invention, reference should now be made to the one or more embodiments illustrated in greater detail in the accompanying drawings and described below wherein:

FIG. 3A illustratively depicts an enlarged perspective view of an inertia block to be employed on the support panel referenced in FIG. 2;

FIG. 3B illustratively depicts an enlarged partial view of the support panel referenced in FIG. 2;

DETAILED DESCRIPTION OF ONE OR MORE EMBODIMENTS

Figure 1:
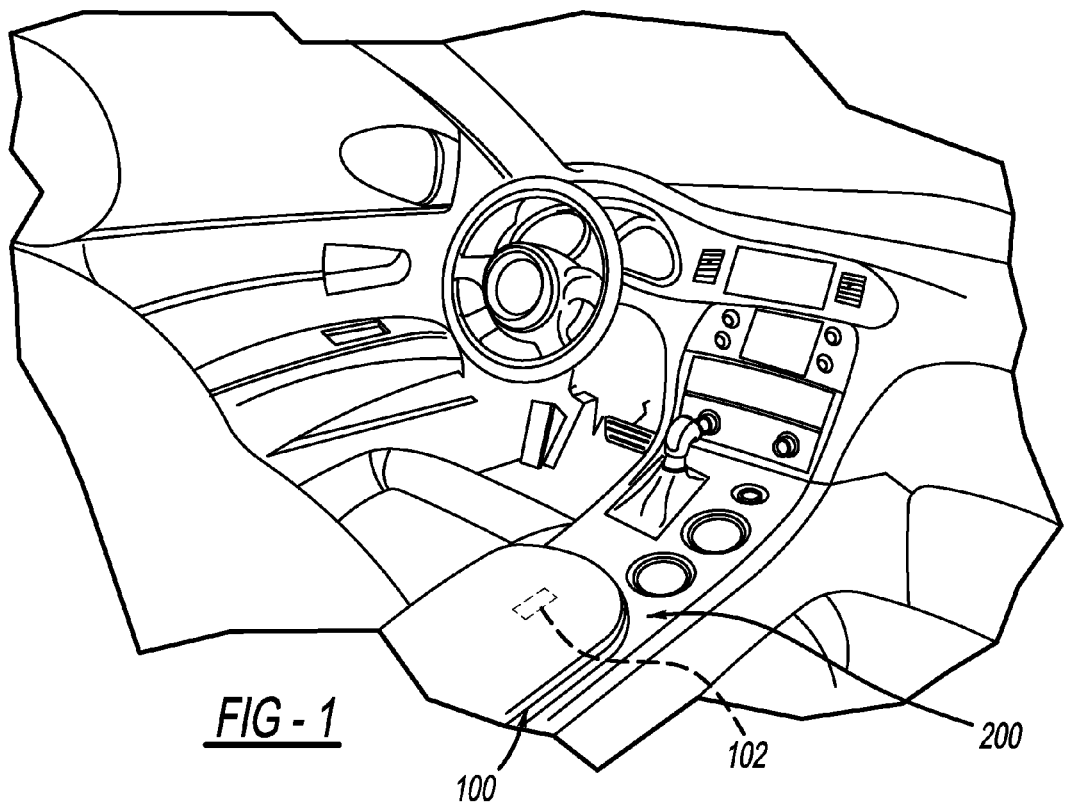
FIG. 1 illustratively depicts a perspective view of a console assembly as positioned within a vehicle in one or more embodiments.

As referenced in the FIG.s, the same reference numerals may be used to refer to the same parameters and components or their similar modifications and alternatives. These specific parameters and components are included as examples and are not meant to be limiting. The drawings referenced herein are schematic and associated views thereof are not necessarily drawn to scale.

Vehicle safety is an important consideration for automobile manufacturers. To this end, many active and passive safety measures have been provided in vehicles. The present invention in one or more embodiments is beneficial at least in providing a console support panel and further a console assembly employing the same where console storage may be fully used for its intended storage purposes while safety concerns associated with deficient covering during an adverse effect such as a collision may be effectively reduced. Without wanting to be limited by any particular theory, it is believed that the console support panel and the console assembly employing the same as described herein elsewhere are advantageously provided with relatively greater ease of installation, reduced amount of rattles or noise-vibration-harshness (NVH), and diminished occurrence of premature inertia block disengagement and hence unwanted safety issues.

Figure 2:
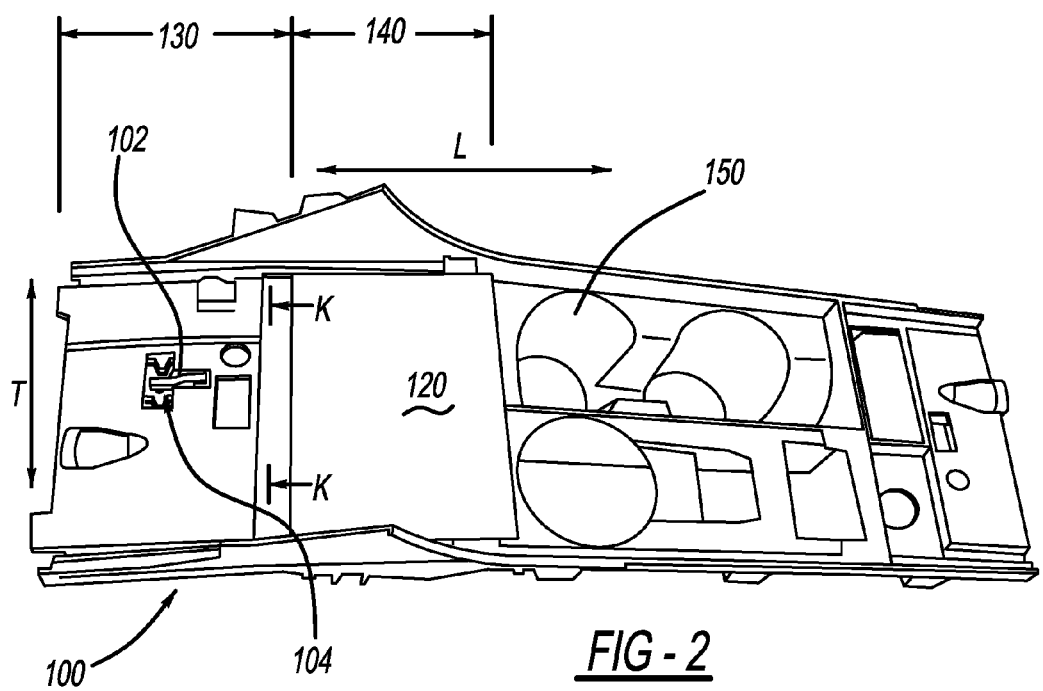
FIG. 2 illustratively depicts a perspective view of a support panel of the console assembly referenced in FIG. 1.

In one or more embodiments, and in view of FIG. 1 and FIG. 2, a console assembly 200 as positioned within a vehicle interior is illustratively depicted to include a support panel 100, a movable cover 120 to be supported on the support panel 100, and an inertia block 102 to be supported on the support panel 100 and to limit movement of the movable cover 120 in direction K during an adverse event where further movement over the limit may not be desirable and sometimes injurious.

Although the inertia block 102 is illustratively depicted in FIG. 1 and FIG. 2 as a part of the console assembly 200, the inertia block 102 as detailed herein may be employed in any suitable cover-including or door-including structures other than a central console assembly, such as a second row console assembly, where the door or the cover desirably needs to be limited in its opening movement upon an impact such as an impact from a collision.

Referring back to FIG. 2 and further in view of FIG. 3A and FIG. 3B, the support panel 100 includes a first portion 130 defining a cavity 104 to receive therein a pivot shaft 332 of the inertia block 102, and a second portion 140 positioned next to the first portion 130 and to support the movable cover 120, wherein the first portion 130 further includes first and second lead-in ribs 314, 324 extending to the cavity 104 to limit or restrain translational movement of the pivot shaft 332 along a depth direction D.

Although the support panel 100 is illustratively depicted in FIG. 2 to also include supplemental structures such as cup holders 150, these supplemental structures may or may not be employed, and when included, may suitably vary in size, shape and/or position.

The support panel 100 and the inertia block 102 are described in more details further in view of FIG. 3A to FIG. 6.

FIG. 3A illustratively depicts an enlarged perspective view of the inertia block 102 referenced in FIG. 2, where the inertia block 102 is depicted to include a body 342 extending along a longitudinal direction L and being supported on the pivot shaft 332 which extends along a transverse direction T. Further a nose 372 extends from and/or is part of the body 342. The body 342 along with the nose 372 may pivot in a pivot direction "P" about the pivot shaft 332 upon an impact. For instance, the nose 372 may move in direction P1 to initiate and/or maintain a service position to limit unwanted movement of the movable door along direction K, and may return to a rest position by moving in direction P2.

The pivot shaft 332 is illustratively depicted in FIG. 3A to include a first end 312 and a second end 322 sandwiching there-between the body 342 in particular along the transverse direction T. The first and second ends 312, 322 may each be an integral part of the pivot shaft 332. Alternatively, and when as desirable, the first and second ends 312, 322 may each be part of a discrete portion or component of the pivot shaft 332, or that the pivot shaft 332 includes or is formed of two separate portions collectively contacting and supporting the body 342, where the first and second ends 312, 322 each sits on one of the separate portions.

FIG. 3B illustratively depicts an enlarged perspective view of a portion of the support panel 100 referenced in FIG. 2 that is to receive and support the inertia block 102, or at least the pivot shaft 332 of the inertia block 102. As mentioned herein elsewhere, the first portion 130 of the support panel 100 further includes first and second lead-in ribs 314 and 324 extending into the cavity 104 to restrain translational movement of the pivot shaft 332 along the depth direction D.

Referring back to FIG. 3B, the first lead-in rib 314 may include first and second legs 314a and 314b, each of them extending along the depth direction D of the cavity 104, where the first and second legs 314a and 314b define there-between an upper gap 352 and a lower gap 350 positioned along the depth direction D, the lower gap 350 being of a gap distance D1 smaller than a gap distance D2 of the upper gap 352. This configuration is believed to facilitate the lead-in movement of the pivot shaft 332 of the inertia block 102 toward the cavity 104 along the depth direction D.

In certain embodiments, the lead-in rib 314 may be formed flexible and/or bendable at least along the longitudinal direction "L" such that the pivot shaft 332 may be led in through the lower gap 350 deeper into the cavity 104 along the depth direction D even if the lower gap distance D1 is smaller than the circumferential dimension Dp, or diameter if the pivot shaft 332 is of a circle in cross-section.

An added benefit of this configuration is that unwanted disengagement of the pivot shaft 332 out from the cavity 104 through the lower gap 350 may be effectively discouraged. Accordingly the lead-in rib 314 is advantageously provided to facilitate both the lead-in engagement and to discourage unwanted disengagement of the pivot shaft 332.

Referring back to FIG. 3A and FIG. 3B, the second lead-in rib 324 may adopt the designs and configurations described in relation to the first lead-in rib 314, at least in part to function in concert with the first lead-in rib 314 in facilitating the engagement and discouraging disengagement of the pivot shaft 332 relative to the cavity 104.

Referring back to FIG. 3A and FIG. 3B, the cavity 104 may define an anterior portion 354 to receive the pivot shaft 332 and a posterior portion 364 to receive a nose 372 of the inertia block 102, the posterior portion 364 extending along the longitudinal direction L and being positioned between the anterior portion 354 and the second portion 140 of the support panel 100. There are no particular restrictions as to whether, how or where the anterior portion 354 is divided from the posterior portion 364 as long as the anterior portion 354 possesses the configuration to receive the pivot shaft 332 and at least partially the body 342 of the inertial block 102, and similarly the posterior portion 364 possesses the configuration to receive at least partially the nose 372 of the inertial block 102. As mentioned herein elsewhere, and to accommodate the presence of the lead-in ribs 314, 324, the anterior portion 354 is further configured to extend along the transverse direction T.

Figure 3C:
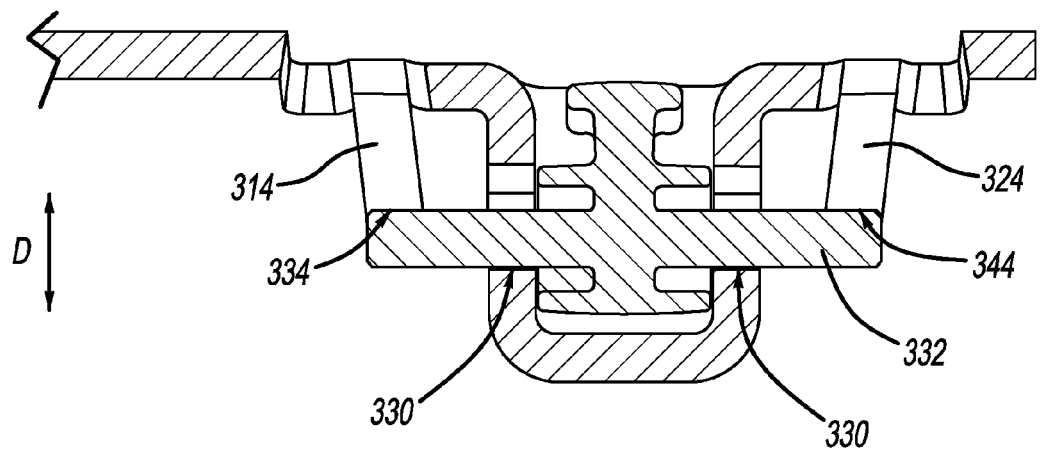
FIG. 3C illustratively depicts a cross-sectional view of the support panel referenced in FIG. 3B, taken along line 3C-3C.
Figure 4A:
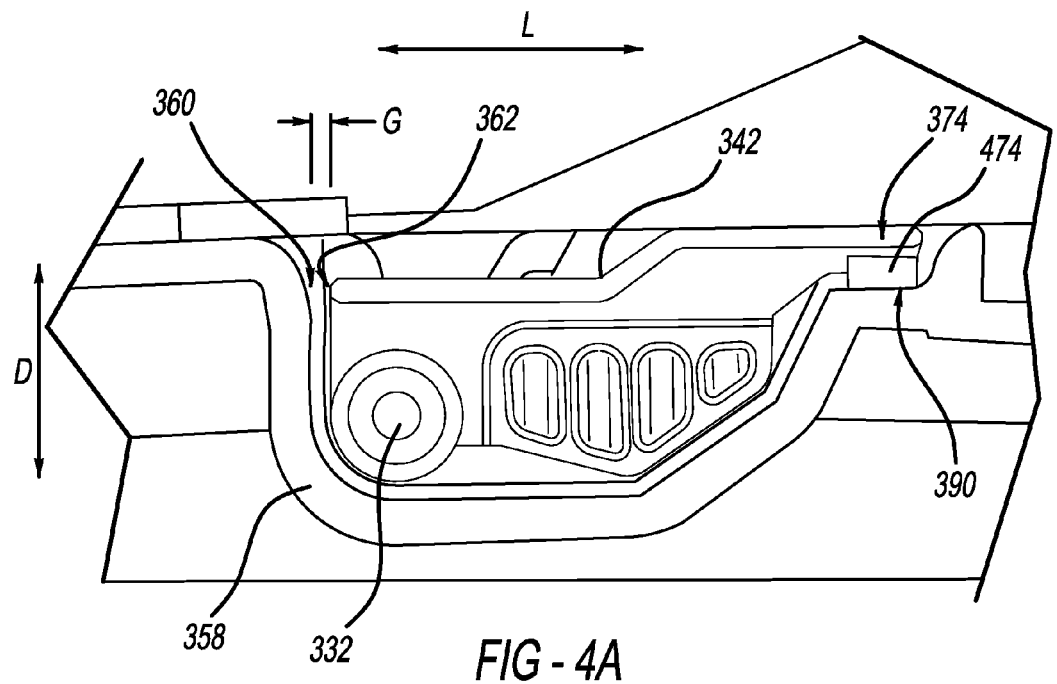
FIG. 4A illustratively depicts a cross-sectional view of the inertia block as positioned on the support panel referenced in FIG. 2, while being at a rest position.
Figure 4B:
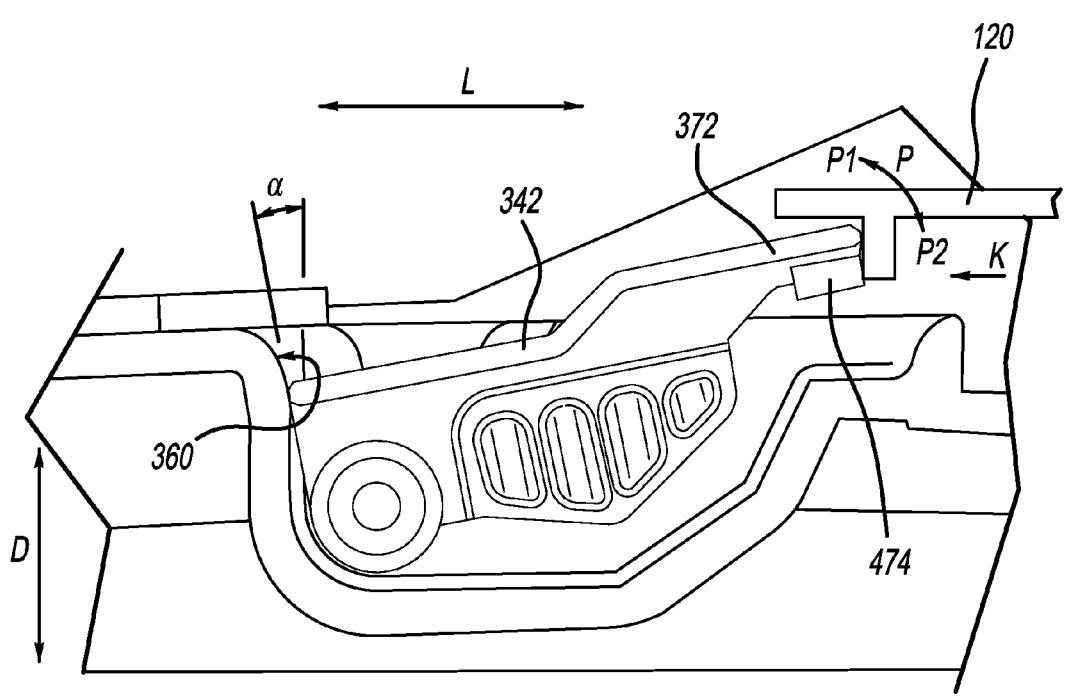
FIG. 4B illustratively depicts a cross-sectional view of the inertia block as positioned on the support panel referenced in FIG. 2, while being at a service position.

Referring back to FIG. 3B and further in view of FIG. 4A and FIG. 4B, the anterior portion 354 of the cavity 104 may include a stopper surface 360 to limit unwanted pivoting movement of the inertia block 102 beyond a permissible extent. For instance at a rest position such as the position illustratively depicted in FIG. 4A, a distance G is positioned between the stop surface 360 of a cavity wall 358 of the cavity 104 and a contact surface 362 of the inertia block 102. At a service position such as the position illustratively depicted in FIG. 4B, the body 342 along with the nose 372 of the inertia block 102 rotates or pivots along direction P1 to limit movement of the door 120 along direction K. Accordingly the contact surface 362 of the inertia block 102 moves to eventually stop at the stop surface 360.

With further reference to FIG. 4B, which illustratively depicts a cross-sectional view of the inertia block in FIG. 2 while being at a service position, the distance G may be translated to a contact angle a between the stop surface 360 and the contact surface 362. This contact angle a accordingly imparts a limit on how far the door 120 may travel along the direction K before the door 120 hits and gets stopped by the nose 372 of the inertia block 102. This may be because during an adverse event such as upon impact due to a collision, the movable door 120 may be presented with a propensity to move along a direction of the impact, such as direction K, meanwhile the inertia block 102 is motivated by a sudden change of motion to rotate or pivot about the pivot shaft 332. Accordingly the nose 372 of the inertia block 102 moves along direction P1 to block against and hence limit the movement of the movable door 120 along direction K. Therefore, the stopper surface 360 of the anterior portion 354 prevents the inertia block 102 from rotating further when a pivot angle a of the inertia block 102 is beyond a permissible or predetermined value.

In addition, the stop surface 362 may be formed integral or as an integral part of the cavity wall 350 via any suitable methods. A non-limiting example method may include material removal via cutting or knifing such that a slopped surface may be created after the cavity wall 358 has been formed. Alternatively, the cavity wall 358 with the stop surface 360 may be formed together via molding. Accordingly the stopper surface 360 is believed to function as an integrated mechanism to retard any unwanted over-extension along direction P1 upon an impact with relatively improved benefits in cost and efficiency.

Structural relationship and operational details regarding the inertia block 104 relative to the cavity 104 may further be found in the description herein in view of FIGS. 4A and 4B.

Referring back to FIG. 4A, a cross-sectional view of the inertia block 102 is illustratively depicted as being positioned within the cavity 104 at a rest position. In particular, the inertia block 102 referenced in FIG. 3A has been inserted or pushed into the cavity 104 defined on the support panel 100, where the pivot shaft 332 of the inertia block 102 has been received by passing through the upper and lower gaps 352, 350 referenced in FIG. 3B, and where the nose 372 of the inertia block 102 is to contact and rest upon a support surface 390 of the cavity wall 358 in the posterior portion 364 of the cavity 104.

Further in relation to FIG. 4A, and as mentioned herein elsewhere, the lead-in ribs 314 and 324 may be provided with a desirable level of flexibility or bendability such that the upper and/or lower gaps 352, 350 may temporarily widen to allow the lead-in of the pivot shaft 332 in its downward movement into the cavity 104 along the depth direction D. Once having passed through the lower gap 350, the pivot shaft 332 rests upon the shaft surface 330. Because of their relative position toward each other, the first and second legs 314a, 314b may naturally return to their rest state from their bended position while allowing the passthrough of the pivot shaft 332. Once having returned to their rest state, the first and second legs 314a, 314b work to effectively prevent a reverse translational movement or discharge of the pivot shaft 332 away out through the lower gap 350.

Moreover, one or both of end surfaces 336, 334 of the first and second legs 314a, 314b may be configured to contact the pivot shaft 332 to provide additional positioning and stabilization of the pivot shaft 332 along with the shaft surface 330. Similarly, one or both end surfaces 346, 344 of the second lead-in rib 324 may be also be configured to contact the pivot shaft 332 to provide further additional positioning and stabilization of the pivot shaft 332 along with the shaft surface 330.

With further reference to FIG. 3C, which illustratively depicts a cross-sectional view of the support panel 100 referenced in FIG. 3B assembled with the inertia block 102 referenced in FIG. 3A, taken along line 3C-3C, the pivot shaft 332 is stabilized between the shaft surface 330 and the end surface 334 and 344 at the assembled state, such that unwanted movement along direction D and hence noises associated with the movement may effectively be reduced or eliminated.

Referring back to FIG. 3A and further in view of FIG. 4A, the inertia block 102 may further include a nose pad 474 to be positioned between the nose 372 and the support surface 390 to reduce rattles or NVH when the vehicle is in motion. The nose pad 474 may differ in material from the inertia block 102 and the nose pad 474 may be formed separately from the nose 372 of the inertia block 102 and thereafter attached to the nose 372 of the inertial block 102 as desirable. In certain embodiments, the body 342 and the nose 372 of the inertial block 102 may first be formed via injection molding, and the nose pad 474 may be formed on the nose 372 via injection molding via molding process concurrently or subsequently.

In certain embodiments, the inertia block 102 includes a first polymeric material, for instance a solid plastic material with a first hardness or stiffness, the nose pad 474 includes a second polymeric material that is different from the first polymeric material, for instance a rubber with a second hardness or stiffness, the first hardness or stiffness being greater than the second hardness or stiffness. With this configuration, it is believed that the inertia block 102 is advantageously provided with desirable strength provided to the body 342 and the nose 372 in particular, and reasonably satisfactory cushion provided between the nose 372 and the cavity wall 350 to avoid excess rattles and noises.

The nose pad 474 may be of any suitable material with non-limiting examples thereof including soft polymers such as rubber and rubber blends. In certain embodiments, the nose pad 474 includes a thermoplastic elastomer.

Figure 5:
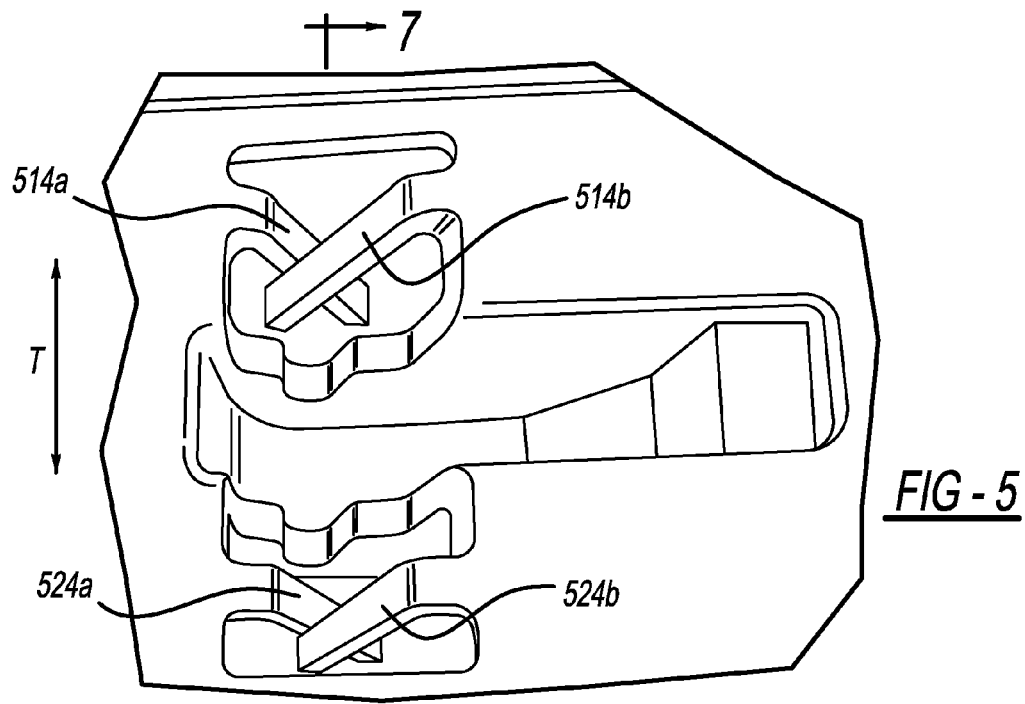
FIG. 5 illustratively depicts an alternative design to the lead-in ribs of the support panel referenced in FIG. 3B.

FIG. 5 illustratively depicts a perspective view of lead-in ribs 514, 524 as an alternative design to the lead-in ribs 314, 324 referenced in FIG. 3B. The first and second lead-in ribs 514, 524 each extend along the depth direction D into the cavity 104, where the lead-in rib 514 may include a first leg 514a and a second leg 514b spaced apart from the first leg 514a along the traverse direction T. Similarly, the second lead-in rib 524 may include a first leg 524a and a second leg 524b spaced apart from the first leg 524a along the transverse direction T.

Figure 7:
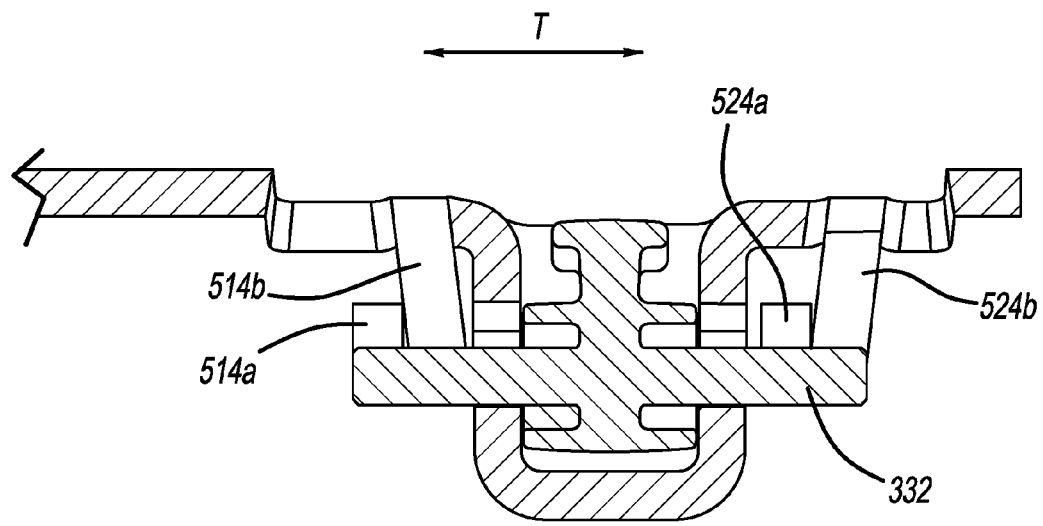
FIG. 7 illustratively depicts a cross-sectional view of the support panel referenced in FIG. 5.

In accordance with this configuration, and if one is to extract a cross section of the lead-in ribs 514, 524 along the transverse direction T, such as the cross section illustratively depicted in FIG. 7, that cross section includes a segment of the first leg 514a, a segment of the second leg 514b, a segment of the first leg 524a and a segment of the second leg 524b. In other words, the first and second legs 514a, 514b go across each other's territories along the longitudinal direction L; and similarly the first and second legs 524a, 524b go across each other's territories along the longitudinal direction L.

In certain embodiments, the support panel 100 may include in its lead-in rib design the lead-in rib 314 or 324 at one side of a body cavity 348 of the cavity 104, and the lead-in rib 514, 524 at the other side.

The lead-in ribs 514, 524 are designed to function similarly to the lead-in ribs 314, 324 referenced in FIG. 3B. For instance installation of the inertia block 102 may be realized by pushing the pivot shaft 332 of the inertia block 102 through-between the first and second lead-in ribs 514 and 524. To facilitate the pushing-through, the lead-in ribs 514 and/or 524 are provided with a desirable amount of flexibility and bendability to allow for a temporary greater separation between the two along the longitudinal direction L such that a space or path between the first and second legs 514a, 514b, and 524a, 524b is temporarily provided to accommodate the lead-in movement of the pivot shaft 332. In certain embodiments, and as illustratively depicted in FIG. 7, the legs 514a, 514b, 524a and 524b may be sized to have their respective ends be positioned just at or above the pivot shaft 332 along the depth direction D, such that only a reasonable force may be needed to push the pivot shaft 332 down along the depth direction D to enter through the crisscross pairs of legs 514a, 514b and legs 524a, 524b, and to rest upon the shaft surface 330.

Due to the "crisscross" design of the first and second legs 514a, 514b, and 524a, 524b as illustratively depicted in FIG. 5, the led-ribs 514, 524 are provided with a relatively greater resistance against bending or deformation, and hence greater tendency to return to their rest state after a forced entry of the pivot shaft 332. The configuration of the lead-in ribs 514, 524 may thus provide a more secured lock-in mechanism for the pivot shaft 332.

Figure 6B:
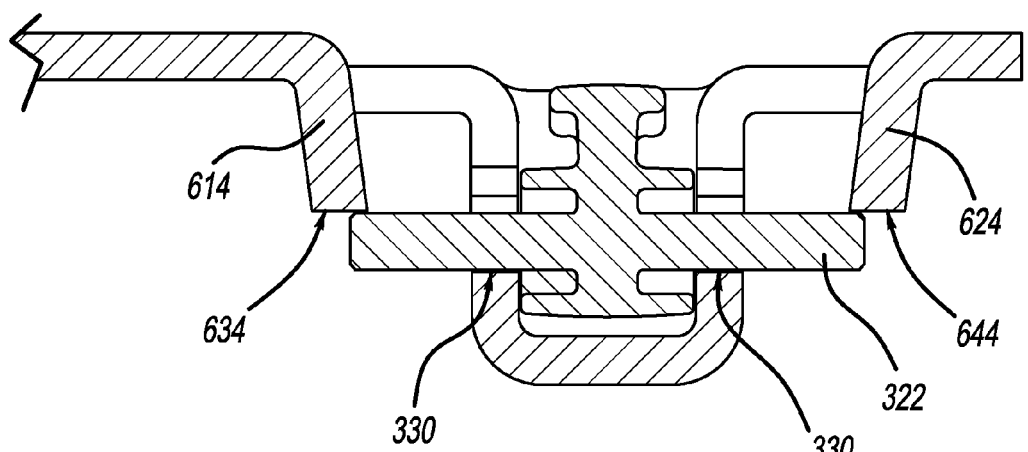
FIG. 6B illustratively depicts a cross-sectional view of the support panel referenced in FIG. 6A, taken along line 6B-6B.
Figure 6A:
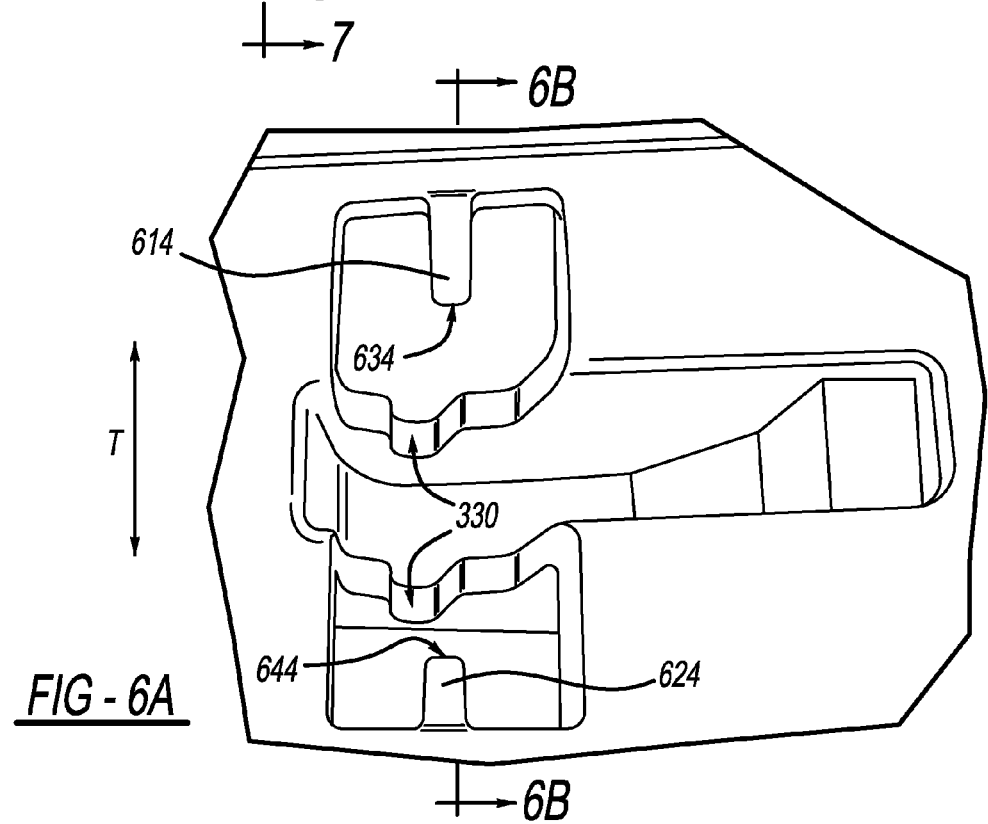
FIG. 6A illustratively depicts yet another alternative design to the lead-in ribs of the support panel referenced in FIG. 3B and FIG. 5.

FIG. 6A illustratively depicts a perspective view of lead-in ribs 614, 624 as yet another alternative design of the lead-in ribs 314, 324 referenced in FIG. 3B, or an alternative design of the lead-in ribs 514, 524 referenced in FIG. 5. Referring back to FIG. 6A, and instead of protruding toward each other in the longitudinal direction L as shown in FIG. 3B and FIG. 5, the lead-in ribs 614 and 624 protrude toward each other along the transverse direction T. Each of the first and second lead-in ribs 614, 624 extends along the depth direction D into the cavity 104.

Further in view of FIG. 6B, which illustratively depicts a cross-sectional view of the support panel 100 referenced in FIG. 6A assembled with the inertial block 102 referenced in FIG. 3A, taken along line 6B-6B, the pivot shaft 322 is stabilized at the assembled position by being positioned between the shaft surface 330 and end surfaces 436, 644 of the first and second lead-in ribs 614, 624, respectively.

In certain embodiments, and when as desirable, the support panel 100 may employ any one of the lead-in ribs 314, 514 and 614 at one side, and any one of the lead-in ribs 314, 524 and 624 at the other side.

The lead-in ribs 314, 324, 514, 524, 614 and 624 may each be formed as being integral in material with the cavity wall 358 defining the cavity 104, via any suitable methods such as formation via molding, and in particular injection molding via which the lead-in ribs may be a natural extension from the cavity wall 358 and be integral with the cavity wall 358 both in material and structure.

Figure 8:
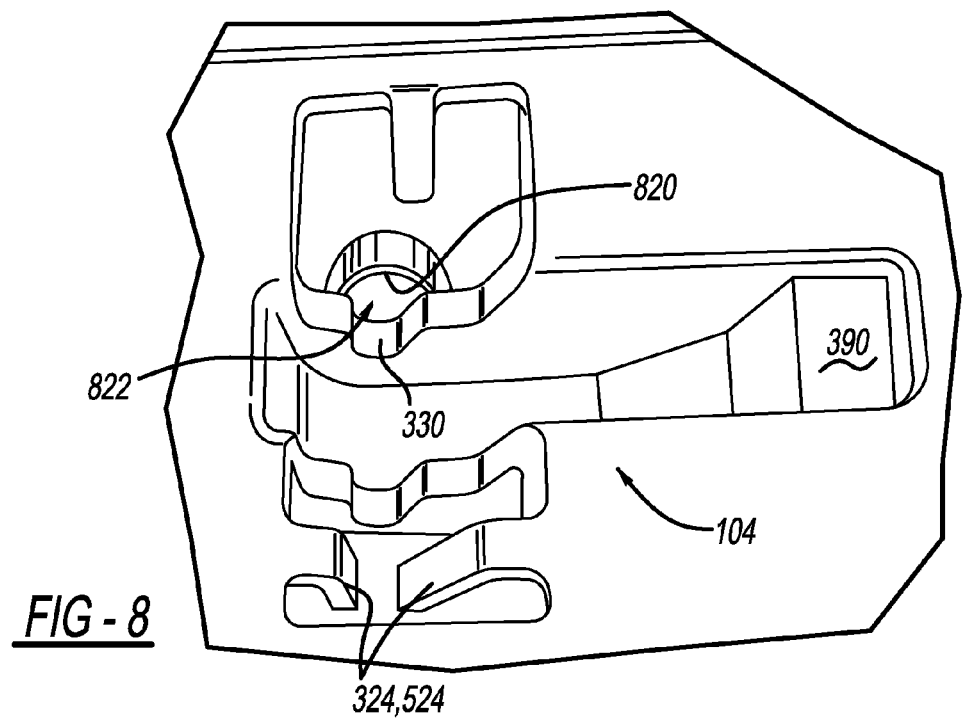
FIG. 8 illustratively depicts another alternative view of the support panel referenced in FIG. 3B and FIG. 5

FIG. 8 illustratively depicts another alternative partial view of the support panel 100 referenced in FIG. 3B and/or FIG. 5. According to FIG. 8, only one lead-in rib such as the lead-in rib 324 referenced in FIG. 3B or the lead-in rib 524 referenced in FIG. 5 may be employed, while a lock-in fixture 820 is provided at a corresponding opposite side. For engagement, the first end 312 of the pivot shaft 332 may further be inserted through a ring aperture 822 of the lock-in fixture 820, and then the second end 322 of the pivot shaft 332 is pressed down in the depth direction D via the lead-in rib 324 or 524 described herein elsewhere. The lock-in fixture 820 may be an integral extension of the cavity wall 580 and may be formed by molding. The lock-in fixture 820 differs from the lead-in rib 314, 324, 514 or 524 in that the lock-in fixture 820 does not have to have an opening to lead-in the pivot shaft 332. Rather, the lock-in fixture 820 functions more as a fixture to securely lock in the first end 312 of the pivot shaft 332. This is particularly beneficial in situations where translational movement along direction D of the pivot shaft 332 may be more frequent and likely for certain vehicle types and/or certain driving styles. The lock-in fixture 820 may be of any suitable shapes, dimensions and positions.

One or more exemplary embodiments are discussed in view of FIG. 1 through FIG. 6 in the context of a console support panel and a vehicle console assembly employing the same and are believed to overcome one or more safety measures associated with the employment of inertia block. However, one skilled in the art will readily recognize from such discussion, and from the accompanying drawings and claims that various changes, modifications and variations can be made therein without departing from the true spirit and fair scope of the invention as defined by the following claims. For instance, the console support panel described herein may be employed in not only vehicle central console assemblies but also second row or rear row console assemblies and side door constructions.

What is claimed is:

1. A support panel of a console assembly, comprising:
a first portion defining a cavity to receive therein an inertia block; and
a second portion positioned next to the first portion and to support a movable cover, wherein the first portion further includes a lead-in rib extending into the cavity to restrain translational movement of a pivot shaft of the inertia block,
wherein:
the cavity is comprised of an anterior portion and a posterior portion,
the anterior portion is configured to extend along a transverse axis and to receive the pivot shaft along the transverse axis,
the posterior portion is configured to extend from the anterior portion along a longitudinal direction orthogonal to the transverse axis, and to receive a nose of the inertia block, and
the lead-in rib extends into the anterior portion in a depth direction orthogonal to the transverse axis and longitudinal direction.

2. The support panel of claim 1, wherein the lead-in rib includes first and second lead-in ribs to contact first and second ends of the pivot shaft at a service position.

3. The support panel of claim 1, wherein the lead-in rib includes first and second legs each extending along a depth direction of the cavity, the first and second legs defining there-between an upper gap and a lower gap positioned along the depth direction, the lower gap being of a gap distance smaller than that of the upper gap.

4. The support panel of claim 1, wherein the lead-in rib includes first and second legs each extending along a depth direction of the cavity, a cross-section of the cavity includes a first section of the first leg and a second section of the second leg.

5. The support panel of claim 1, wherein at least one of the pair of lead-in ribs is formed from and identical in material with a cavity wall defining the cavity.

6. The support panel of claim 1, wherein the lead-in rib includes a first leg and a second leg spaced apart from the first leg along the longitudinal direction.

7. The support panel of claim 1, wherein the lead-in rib includes first and second lead-in ribs opposing toward each other along a transverse direction.

8. The support panel of claim 1, wherein the anterior portion includes therein a stopper surface to limit pivoting movement of the inertial block.

9. A support panel of a console assembly, comprising:
a first portion defining a cavity;
an inertia block including a pivot shaft received within the cavity; and
a second portion positioned next to the first portion and to support a movable cover, wherein the first portion further includes a lead-in rib extending into the cavity to restrain translational movement of the pivot shaft,
wherein the first portion comprises a contiguous surface in a single plane, and the cavity extends in a depth direction from a surface of the single plane.

10. The support panel of claim 9, wherein the lead-in rib includes first and second lead-in ribs to restrict translational movement of first and second ends of the pivot shaft, respectively.

11. The support panel of claim 9, wherein the inertia block includes a nose and a nose pad contacting the nose, the nose pad including a polymeric material.

12. The support panel of claim 9, wherein the inertia block differs in material from the first portion.

* * * * *